(12) United States Patent
Sockolosky (10) Patent No.: US 9,469,194 B2
(45) Date of Patent: Oct. 18, 2016

(54) METER POINTER WITH A DOT-MATRIX ARRAY

(71) Applicants: DENSO International America, Inc., Southfield, MI (US); DENSO CORPORATION, Kariya, Aichi-pref. (JP)

(72) Inventor: Kevin Sockolosky, Canton, MI (US)

( * ) Notice: Subject to any disclaimer, the term of this patent is extended or adjusted under 35 U.S.C. 154(b) by 141 days.

(21) Appl. No.: 14/556,625

(22) Filed: Dec. 1, 2014

(65) Prior Publication Data

US 2016/0152139 A1 Jun. 2, 2016

(51) Int. Cl.
*G08B 21/00* (2006.01)
*B60K 35/00* (2006.01)

(52) U.S. Cl.
CPC ....... *B60K 35/00* (2013.01); *B60K 2350/1064* (2013.01); *B60K 2350/352* (2013.01)

(58) Field of Classification Search
CPC ...................................................... B60K 35/00
USPC ................... 340/441, 487, 488, 688; 345/31
See application file for complete search history.

(56) References Cited

U.S. PATENT DOCUMENTS

| | | |
|---|---|---|
| 5,050,045 A | 9/1991 | Kato et al. |
| 6,856,303 B2 | 2/2005 | Kowaleski |
| 2010/0289637 A1 | 11/2010 | Ewers et al. |

FOREIGN PATENT DOCUMENTS

WO 2011-011003 A1 1/2011

*Primary Examiner* — Jeffery Hofsass (57) ABSTRACT

A meter pointer for a meter includes an arm. The arm includes a display. The display has a dot-matrix array including pixels. Each of the pixels is configured to change in intensity. The dot-matrix array is configured to indicate a graphic image with at least one of the pixels by controlling the intensity of each of the pixels.

15 Claims, 6 Drawing Sheets

METER POINTER WITH A DOT-MATRIX ARRAY

TECHNICAL FIELD

The present disclosure relates to a meter pointer for a meter.

BACKGROUND

Conventionally, a vehicle has a meter cluster including various meters such as a speed meter and an engine revolution meter. A meter has a meter pointer rotational relative to a meter body for indicating a present speed of the vehicle or a present revolution of an engine of the vehicle. Conventionally, a meter pointer has, for example, a transparent body to conduct therethrough illumination irradiated from a light source equipped in the meter body. In such a conventional meter pointer, illumination is formed substantially in uniform on its surface. It may be further desirable to enable a meter pointer to indicate various information such as a graphic image.

SUMMARY

It is an object of the present disclosure to produce a meter pointer for a meter, configured to indicate a graphic image thereon.

According to an aspect of the present disclosure, a meter pointer for a meter, the meter pointer comprises an arm including a display. The display has a dot-matrix array including a plurality of pixels. Each of the pixels is configured to change in intensity. The dot-matrix array is configured to indicate a graphic image with at least one of the pixels by controlling the intensity of each of the pixels.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
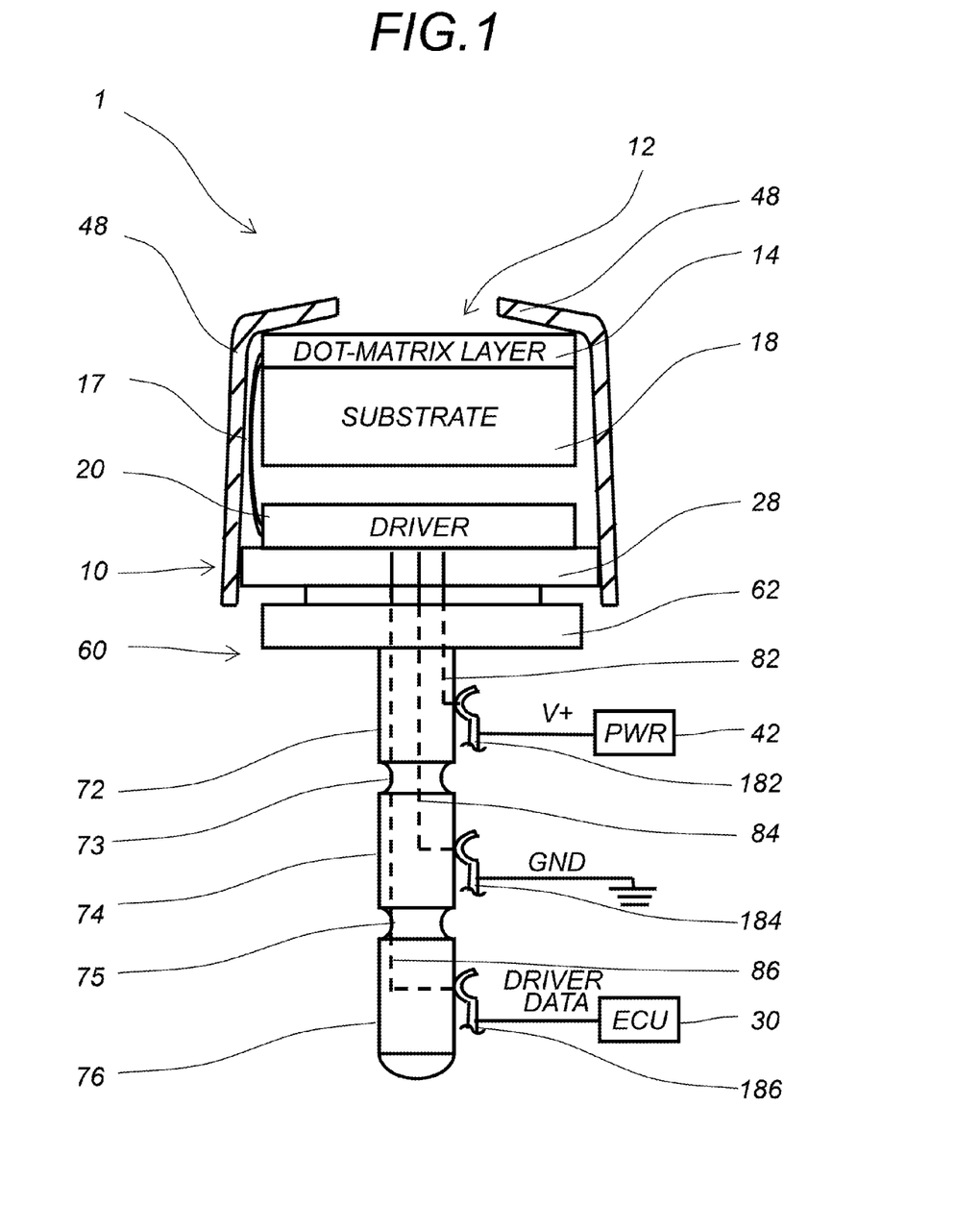
FIG. 1 is a partially sectional view showing a meter pointer and a schematic diagram of devices included in the meter pointer.
Figure 2:
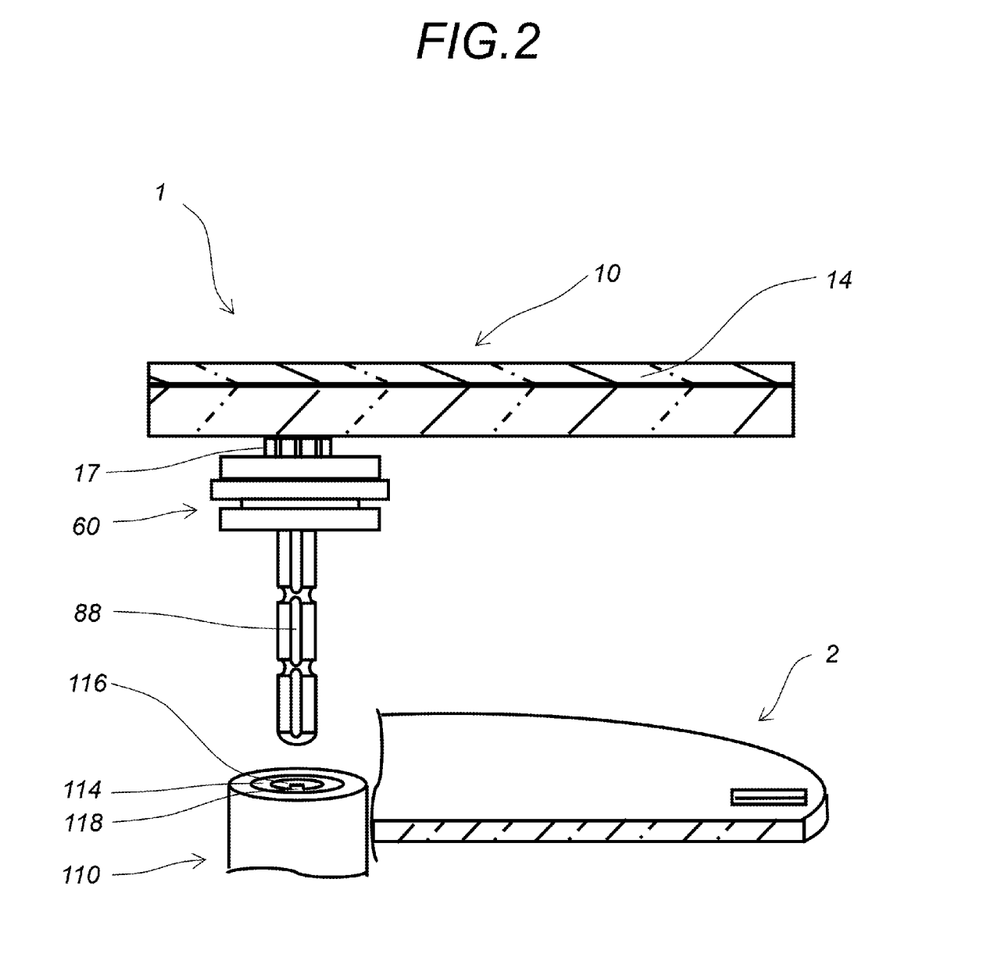
FIG. 2 is a partially sectional view showing the meter pointer.
Figure 3:
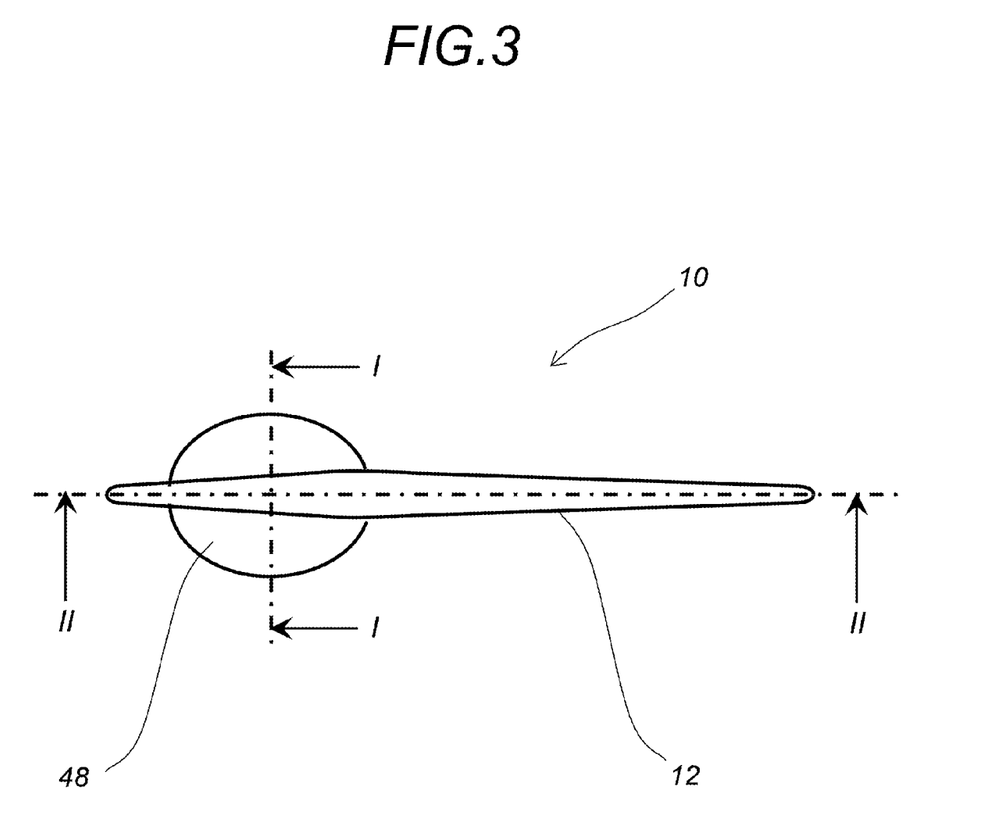
FIG. 3 is a top view showing the meter pointer.

As follows, a configuration of the meter pointer 1 will be described with reference to FIGS. 1 to 3. FIG. 1 shows a cross section taken along the line I-I in FIG. 3. FIG. 2 shows a cross section taken along the line II-II in FIG. 3.

As shown in FIG. 1, the meter pointer 1 includes an arm 10 and a jack connector 60. The arm 10 includes a display 12 and a printed circuit board (PCB) 28. The display 12 is affixed to the PCB 28 via a hub 48. The hub 48 is a substantially dome-shaped member formed of, for example, a resin material.

First, a configuration of the display 12 will be described. In the present embodiment, the display 12 is an organic light emitting display (OLED) having a self-luminous configuration. The display 12 may be a monochromatic ON/OFF display or may be a full-color and high pixel-density display configured to indicate a gradation to produce a pattern effect.

The display 12 includes a dot-matrix layer 14 and a substrate 18. The substrate 18 is a plate-shaped member formed of, for example, a glass material and/or a resin material. The dot-matrix layer 14 is formed on the substrate 18 to have a dot-matrix array in which multiple segmented pixels are arranged in a matrix state. The dot-matrix layer 14 may be formed by, for example, ink-jet printing of a luminescence material on a surface of the substrate 18 or may be formed by vapor-phase deposition of a luminescence material on a surface of the substrate 18 in a vacuum chamber.

The display 12 is configured to change an intensity of each of the pixels. The intensity may encompass intensity of illumination caused by each pixel and/or intensity of a color of each pixel. The intensity may encompass intensity of shielding of a backlight in a configuration in which the display employs a backlight device. The dot-matrix layer 14 is configured to indicate a graphic image formed with aggregation of the pixels. The dot-matrix layer 14 is further configured to switch indication of multiple graphic images thereby to change a shape and/or a position of the graphic image to show a moving picture, such as an animation.

The dot-matrix array of the dot-matrix layer 14 includes, for example, M×N pixels arranged in a matrix state, each of M and N being an integer greater than or equal to 2. The matrix-arrangement may be formed along, for example, perpendicular two directions such as a longitudinal direction of the arm 10 and a width direction of the arm 10. In the following description, an example of the dot-matrix layer 14 having the M×N dot-matrix array will be described for simplifying the explanation. It is noted that, the dot-matrix array is not limited to the M×N dot-matrix array and may have various configurations.

Figure 4:
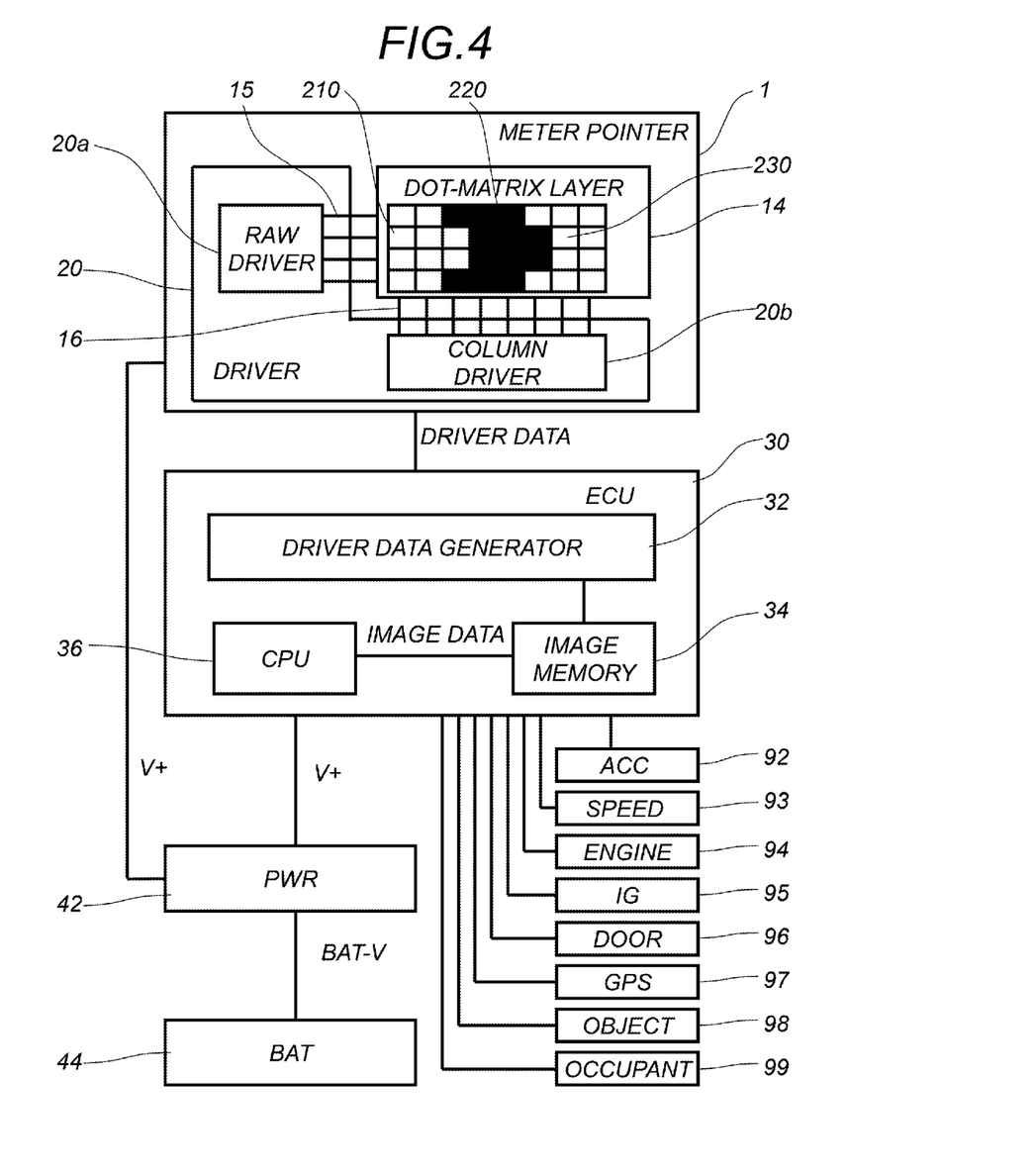
FIG. 4 is a diagram showing electrical connection among the meter pointer, an ECU, a power source, and a battery.

Subsequently, an electrical configuration of the meter pointer 1 and peripheral components for driving the display 12 will be described with reference to FIG. 4. In the simplified example of FIG. 4, the dot-matrix layer 14 has a 4×8 dot-matrix array. Each of the pixels of the dot-matrix array is formed with an electroluminescence element formed at an intersection between a scanning line 15 and a signal line 16. In the present example, the scanning line 15 is an anode line, and the signal line 16 is a cathode line.

A driver IC (driver) 20 is configured to receive driver data from a driver data generator 32 in an electronic control unit (ECU) 30 and to cause the dot-matrix layer 14 to indicate an image corresponding to the driver data. In the present example, the driver 20 includes a raw driver 20a and a column driver 20b coupled with the dot-matrix layer 14 through the scanning lines 15 and the signal lines 16, respectively. The raw driver 20a supplies a scanning line signal through the scanning lines 15 to the dot-matrix layer 14. The column driver 20b supplies an electric signal through the signal lines 16 to the dot-matrix layer 14.

When the driver 20 drives the dot-matrix layer 14, the raw driver 20a sequentially scans the four scanning lines 15 one-by-one. Simultaneously, the column driver 20b supplies an electric signal to each target among the eight signal lines 16. In this way, the driver 20 sequentially drives each electroluminescence element at the inter section between the scanning line 15 and the signal line 16, thereby to illuminate aggregation of pixels and to cause the dot-matrix layer 14 to indicate an image corresponding to the aggregation of pixels. Thus, the driver 20 controls intensity of illumination of each of the pixels. In the example of FIG. 4, the dot-matrix layer 14 indicates an arrow-shaped ON-pixel portion 220 interposed between OFF-pixel portions 210 and 230. The simplified view of FIG. 4 corresponds to an example of FIG. 5B described later. The driver 20 drives the dot-matrix layer 14 to indicate one flame of an image at a constant frequency, such as 90 Hz or more.

In a configuration where the dot-matrix layer 14 has a function to indicate an RGB-color image, the driver 20 may implement the above-described scanning operation for each of an R (red) dot-matrix array, a G (green) dot-matrix array, and a B (blue) dot-matrix array sequentially.

The ECU 30 may be a generally known computer configured with a CPU 36, an image memory 34 and the driver data generator 32. The ECU 30 may further include a RAM, a ROM, and an I/O device. The CPU 36 executes various programs to generate image data, which represents a graphic image to be indicated on the dot-matrix layer 14, sequentially to form a moving picture.

The image memory 34 sequentially receives the image data from the CPU 36 and sequentially stores the image data. The driver data generator 32 retrieves the image data from the image memory 34 and generates the driver data corresponding to the image data. The driver data generator 32 sends the generated driver data to the driver 20 for driving the driver 20 via, for example, serial communications through a single driver data line. In this way, the ECU 30 sends the driver date, which corresponds to the sequential image data, to the driver 20 thereby to cause the dot-matrix layer 14 to indicate a moving picture.

A power source 42 receives electricity at BAT-V voltage from a battery 44 and supplies electricity at a constant voltage to the ECU 30 and the driver 20. The ECU 30 is further coupled with an acceleration (ACC) sensor 92, a speed sensor 93, an engine sensor 94, an IG device 95, a door sensor 96, a global positioning system (GPS) 97, an object sensor 98, and an occupant sensor 99. The object sensor 98 is, for example, a radar sensor configured to send a radar wave and to receive reflection of the radar wave to detect an object close to the vehicle, in order to avoid collision of the vehicle to the detected object. The object sensor may be an image sensor for acquiring image outside the vehicle. The occupant sensor 99 is, for example, an image sensor for acquiring image inside the vehicle, and/or a pressure detector equipped in a seat of the vehicle for sensing pressure caused by an occupant seated on the seat.

The ECU 30 receives an accelerator position from the ACC sensor 92, a speed of the vehicle from the speed sensor 93, and a revolution of the engine from the engine sensor 94. The ECU 30 is further configured to receive a signal representing an ignition state of the engine from the IG device 95, a door position of a specific door of the vehicle from the door sensor 96. The ECU 30 is further configured to receive a signal representing the position of the vehicle from the GPS 97, information representing a detected object from the object sensor 98, a signal representing information about an occupant from the occupant sensor 99.

The CPU 36 executes various processing according to the signals and information received from the sensors and devices 92 to 99. More specifically, the CPU 36 implements various operations such as a welcome sequence, a warning sequence, and/or a driving support sequence. The welcome sequence is implemented to welcome or entertain an occupant on detection of existence of the occupant in response to the signals from, for example, the IG device 95, the door sensor 96, and/or the occupant sensor 99. The warning sequence is implemented on detection of an object such as an oncoming vehicle in response to the signal from, for example, the object sensor 98. The driving support sequence is implemented to guide a driver to turn the vehicle, to accelerate and/or decelerate the vehicle in response to the signal from, for example, the ACC sensor 92, the speed sensor 93, the engine sensor 94, the GPS 97, and/or the object sensor 98.

Referring back to FIG. 1, the PCB 28 is equipped with the driver 20. The driver 20 is electrically coupled with the PCB 28 via wirings (not shown) printed on the PCB 28. The driver 20 is electrically coupled with the dot-matrix layer 14 via a flexible cable 17, which includes the scanning line 15 and the signal line 16.

As follows, the jack connector 60 will be described with reference to FIG. 1. The jack connector 60 is secured to the PCB 28 and electrically coupled with the driver 20 via the PCB 28. The jack connector 60 is configured similarly to, for example, a ⅛" headphone jack. Specifically, the jack connector 60 includes a body 62, a $V_+$ contact 72, a GND contact 74, a driver data contact 76, and insulators 73, 75, which are secured to each other. The $V_+$ contact 72, the GND contact 74, and the driver data contact 76 are arranged in series alternately via the insulators 73, 75 and electrically insulated from each other via the insulators 73, 75, thereby to form segmented electric contacts. The body 62, the $V_+$ contact 72, the GND contact 74, and the driver data contact 76 are formed of a conductive material such as a metallic material. The insulators 73, 75 are formed of a non-conductive material such as a resin material.

The jack connector 60 accommodates a $V_+$ line 82, a GND line 84, and a driver data line 86, which are electrically coupled with the driver 20 at one ends. The $V_+$ line 82, the GND line 84, and the driver data line 86 are electrically coupled with the $V_+$ contact 72, the GND contact 74, and the driver data contact 76, respectively, at the other ends. The $V_+$ contact 72, the GND contact 74, and the driver data contact 76 are further electrically in contact with a $V_+$ brush 182, a GND brush 184, and a driver data brush 186, which are external components from the jack connector 60, when the jack connector 60 is attached to a drive shaft 110 of a meter 2 (FIG. 2). The $V_+$ brush 182 is electrically coupled with the power source 42. The GND brush 184 is electrically grounded. The driver data brush 186 is electrically connected with the ECU 30.

FIG. 2 shows the meter pointer 1 to be mounted onto the meter 2. More specifically, the jack connector 60 of the meter pointer 1 is plugged into a drive shaft 110 of the meter 2. The drive shaft 110 is in a hollow tubular shape formed of, for example, a metallic material. The drive shaft 110 has a non-conductive layer 114, which is located radially inside of the drive shaft 110. The non-conductive layer 114 is formed of a non-conductive material such as a resin material. The non-conductive layer 114 has an insertion hole 116 configured to receive the jack connector 60. The non-conductive layer 114 accommodates the $V_+$ brush 182, the GND brush 184, and the driver data brush 186 (FIG. 1), which are to be electrically coupled with the $V_+$ contact 72, the GND contact 74, and the driver data contact 76 of the jack connector 60, respectively, when the jack connector 60 is inserted into the insertion hole 116. The non-conductive layer 114 has a key 118, which protrudes from the inner circumferential periphery of the non-conductive layer 114 radially inward. The key 118 extends along the axial direction of the drive shaft 110.

The drive shaft 110 is rotated by a stepper motor via reduction gears (none shown). The stepper motor is mounted to a meter PCB (not shown) of the meter 2 via metal pins (not shown) and electrically coupled with the meter PCB.

The jack connector 60 has a key groove 88, which is dented in the radial direction from the circumferential periphery of the jack connector 60 and is extended along the axial direction of the jack connector 60. When the jack connector 60 is mounted to the drive shaft 110, the key groove 88 of the jack connector 60 is aligned relative to the key 118 of the drive shaft 110 in the circumferential direction, and the jack connector 60 is inserted into the insertion hole 116 of the drive shaft 110. While the jack connector 60 is inserted into the drive shaft 110, the brushes 182, 184. 186 are resiliently bent and returned back and forth along the surface of the contacts 72, 74, 76 and the insulators 73, 75 of the jack connector 60 to produce a clicking haptic sense.

The present keyed configuration between the key 118 and the key groove 88 securely couples the meter pointer 1 with the drive shaft 110 thereby to withstand torque transfer and to resist slipping and angular misalignment between the meter pointer 1 and the drive shaft 110. In addition, the jack connection between the jack connector 60 and the drive shaft 110 facilitates attachment and detachment of the meter pointer 1 to the meter 2, without requiring a special tool. Furthermore, the jack connection may enable commonality of the connection between the mater pointer 1 and the meter 2.

Figure 5A:
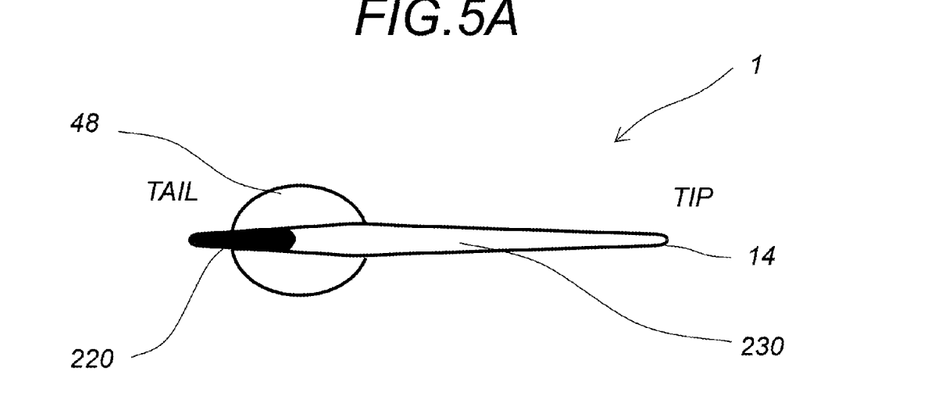
FIGS. 5A to 5C are views each showing a moving picture indicated on the meter pointer.
Figure 5B:
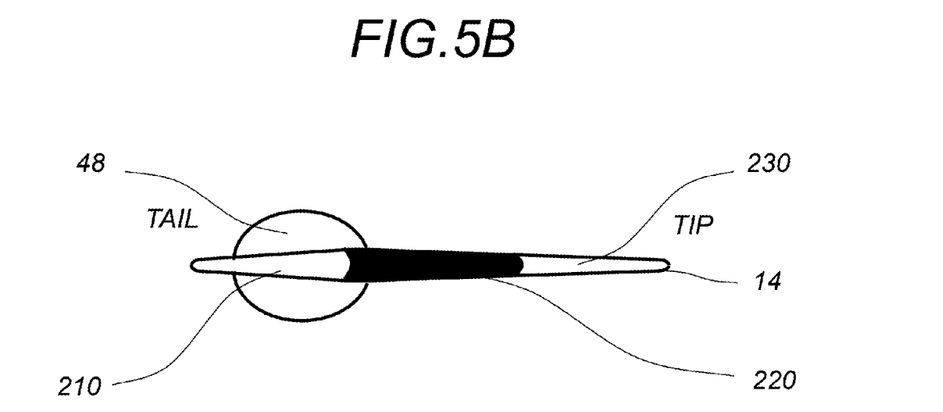
Figure 5C:
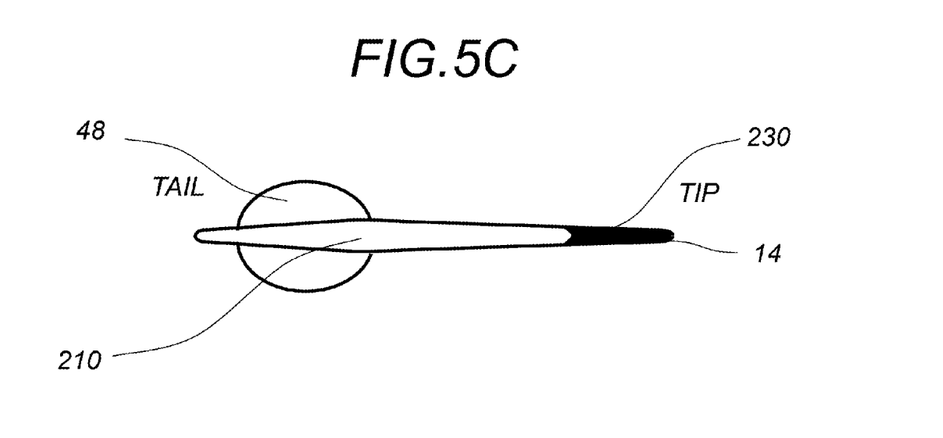

As follows, examples of indication of a graphic image on the dot-matrix layer 14 will be described with reference to FIGS. 5A to 8. First, an example of indication of a moving picture (animation) on the dot-matrix layer 14 will be described. FIGS. 5A to 5C shows an example of an animation indicated on the dot-matrix layer 14. In FIG. 5A, the dot-matrix layer 14 indicates the ON-pixel portion 220 in the arrowhead-shape at its tail and an OFF-pixel portion 230 at its center and tip. The ON-pixel portion 220 is shown in black, and the OFF-pixel portion 230 is shown in while in the drawing. In FIG. 5B, the ON-pixel portion 220 moves to the center of the dot-matrix layer 14. In the state of FIG. 5B, the ON-pixel portion 220 is interposed between the OFF-pixel portions 210 and 230 at the tip and the tail. In the state of FIG. 5C, the ON-pixel portion 220 further moves to the tip of the dot-matrix layer 14, and the OFF-pixel portion 210 is located at the tail. In this way, the ON-pixel portion 220 moves from the tail to the tip along the longitudinal direction of the dot-matrix layer 14 in the order of FIGS. 5A to 5C.

The movement of the ON-pixel portion 220 may be implemented once or may be implemented successively by repeating the states of FIGS. 5A to 5C sequentially. The movement of the ON-pixel portion 220 may have various variations, such as in opposite direction from FIG. 5C to FIG. 5A and/or in a width direction of the dot-matrix layer 14. The shape of the ON-pixel portion 220 may have various variations, such as an oval, a rectangular, a rhombic, a trapezoid, and any combination of these shapes. The number of the ON-pixel portion 220 may have various variations, such as two, or more.

The moving picture (animation) indicated on the meter pointer 1 may be used for the welcome sequence, the warning sequence, and/or the driving support sequence. Specifically, for example, the moving picture indicated on the meter pointer 1 may be used in the driving support sequence to notify a driver to turn the vehicle, to accelerate the vehicle, and/or to decelerate the vehicle. For example, the ON-pixel portion 220 may be moved from the tail to the tip when notifying the driver to accelerate the vehicle. Alternatively, the ON-pixel portion 220 may be moved from the tip to the tail when notifying the driver 20 to decelerate the vehicle. Alternatively, the ON-pixel portion 220 may be moved in a width direction when notifying the driver 20 to turn the vehicle. The moving picture may be caused in the welcome sequence and/or the warning sequence.

The ON-pixel portion 220 may be moved from any position in the arm 10 to any position in the arm 10. For example, the ON-pixel portion 220 may be moved from the center close to the hub 48, instead of the tail, and may be moved to an intermediate position between the hub 48 and the tip. The ON-pixel portion 220 may be moved in the longitudinal direction of the arm 10, as described above, may be moved in the width direction of the arm 10, and may be moved in both the longitudinal direction and the width direction.

Figure 6:
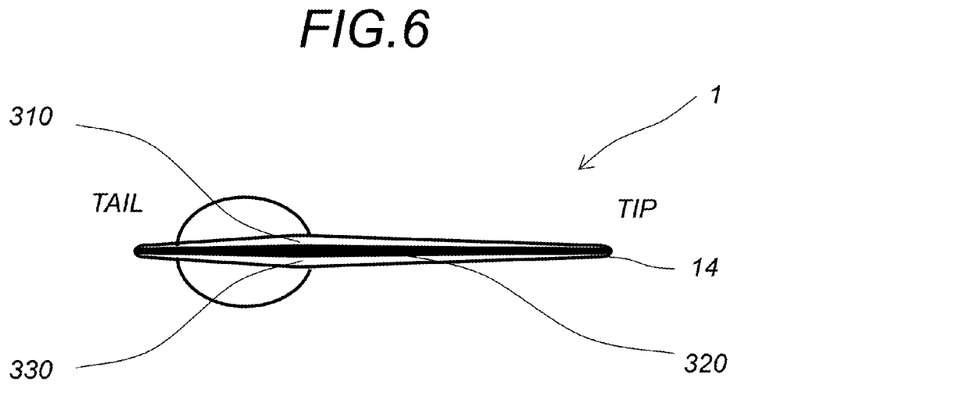
FIGS. 6 to 8 are views each showing an example of a graphic image indicated on the meter pointer.
Figure 7:
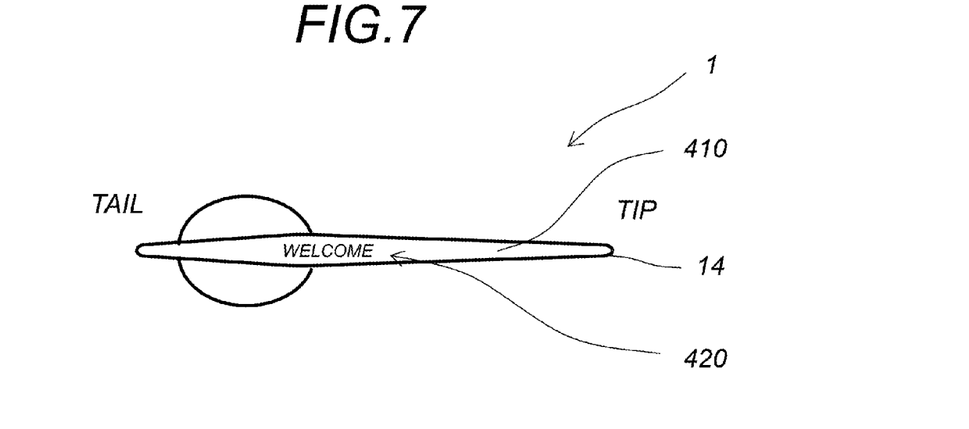

As follows, examples of indication of an image on the dot-matrix layer 14 will be further described with reference to FIGS. 6 to 8. As shown in FIG. 6, the dot-matrix layer 14 may indicate an ON-pixel portion 320. The ON-pixel portion 320 is thinner than the width of the dot-matrix layer 14 and interposed between OFF-pixel portions 310 and 330 in the width direction of the dot-matrix layer 14. In this way, the meter pointer 1 is enabled to have a thinner appearance. The present effect may be further significant in a configuration employing a transparent substrate configured to show the OFF-pixel portion being transparent. The width of the ON-pixel portion 220 may be modified in response to, for example, preference of an occupant or a condition of the vehicle such as a daytime or a nighttime.

The dot-matrix layer 14 may indicate various information such as letters and/or various symbols. For example, as shown in FIG. 7, the dot-matrix layer 14 may indicate an ON-pixel portion 420 surrounded by an OFF-pixel portion 410. The ON-pixel portion 420 shows letters representing a welcome message. The ECU 30 may implement, for example, the welcome sequence, the warning sequence, and/or the driving support sequence and may cause the meter pointer 1 to indicate the ON-pixel portion 420 representing letters and/or symbols related to the welcome sequence, the warning sequence, and/or the driving support sequence. More specifically, the dot-matrix layer 14 may indicate the welcome message, the present date and time, a warning message, and/or the like. The meter pointer 1 may notify a driver of incoming phone call.

Figure 8:
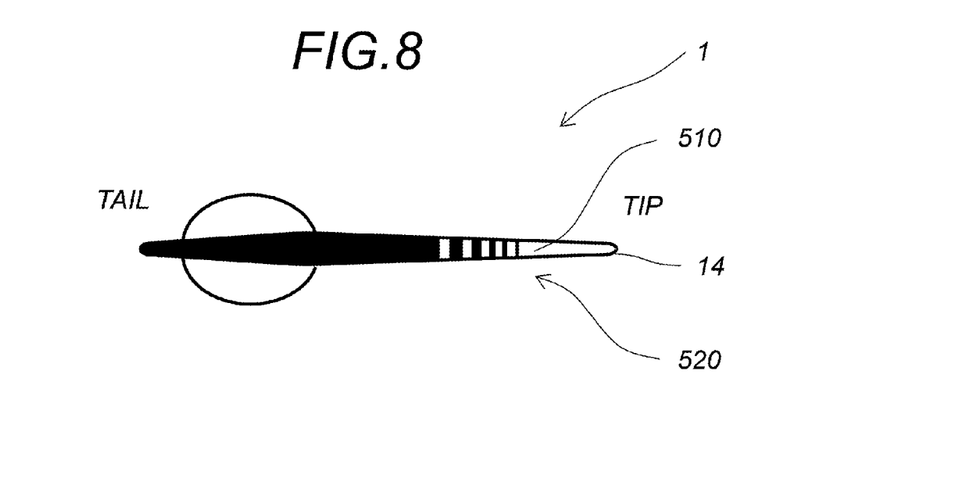

As shown in FIG. 8, the dot-matrix layer 14 may indicate an OFF-pixel portion 510 at the tip and may indicate an ON-pixel portion 520 representing a bar-scale at the center and tail. The bar-scale may be changeable in length according to a driving state of the vehicle, such as the speed of the vehicle, the revolution of the engine, a steering angle of a steering wheel, the accelerator position, and/or a brake pedal position. The bar-scale indication may be used to represent a fuel efficiency of the vehicle at the present state. For example, the ECU 30 may compute the fuel efficiency according to various vehicle states, such as the accelerator position, the revolution of the engine, and/or a quantity of fuel consumption, and may cause the dot-matrix layer 14 to change the length of the bar-scale 520 according to the computed fuel efficiency. In this way, the meter pointer 1 is enabled to notify the driver of the present fuel efficiency correspondingly to the length of its bar-scale 520. The meter pointer 1 may further indicate a desirable fuel efficiency correspondingly to the length of an additional bar scale. The bar-scale indication on the dot-matrix layer 14 may be used to represent a detected alcohol concentration of the driver. The meter pointer 1 may enable the driver to adjust a cruise control speed. The ON-pixel portion 520 may not represent the bar-scale and may indicate a shorter meter pointer. In this way, the meter pointer 1 is enabled to have a shorter appearance. In addition, the dot-matrix layer 14 may variously indicate a short ON-pixel portion 520 or a long ON-pixel portion 520, such that the meter pointer 1 is viewed to be short or long.

The meter pointer 1 may change its color, for example, from blue to red for warning a driver of, for example, collision of the vehicle, over speed of the vehicle, and/or a malfunction caused in the vehicle.

The above-described animation and effects with reference to FIGS. 5A to 8 may be applied to various conditions. For example, the meter pointer 1 may change its indication according to an environment of the vehicle, such as an ambient temperature, the present day and time, and/or a present climate. Alternatively or in addition, the meter pointer 1 may change its indication according to a preference of the driver, a kind of the driver and/or another occupant according to a result of, for example, image recognition by using the occupant sensor 99. The meter pointer 1 may be configured to implement various complicated indications and various lighting effects to notice a state of a cruise control set, a tie-in sign with a telltale sign, a warning, and/or a message. The meter pointer 1 may be configured to implement radiating and/or animating colors, flashing and/or travelling light between, for example, the tip and the tail of the arm 10. The meter pointer 1 may be configured to change its indication to help the driver to focus attention. For example, the indication may be changed when the vehicle moves from the United States employing a primary MPH scale on the meter 2 into, for example, Canada employing a secondary km/h scale on the meter 2 in a configuration in which the meter 2 is employed as a speed meter.

OTHER EMBODIMENTS

The display 12 is not limited to the OLED and may be another device such as a liquid crystal display (LCD) or a plasma display. In a configuration employing the LCD, the display 12 may have an additional backlight device behind or around its dot-matrix layer. In the above-described configuration employing the OLED, a backlight device can be omitted thereby to enable reduction in thickness of the arm 10 and to secure greater space in the hub 48 or to downsize the meter pointer 1.

The display 12 may employ an active matrix configuration. In this case, the surface of the substrate 18 may be equipped with a TFT layer on which the dot-matrix layer the is overlaid. The TFT layer may include TFT switches electrically coupled with the electroluminescence elements, respectively.

The dot-matrix array of the dot-matrix layer 14 may have various arrangements in various shapes formed of a single or a combination of various shapes such as a circle, an oval, a triangle, a rectangle, a rhombic, a trapezoid, and other shapes.

The dot-matrix array of the dot-matrix layer 14 may be formed with, for example, M1×N1 center dot-matrix array located along the longitudinal direction of the meter pointer 1 and M2×N2 side dot-matrix array located on the lateral sides of the center dot-matrix array (M1>M2, N1>N2), thereby to form an octagonal shape.

The driver 20 may be integrated with the dot-matrix layer 14 and/or the substrate 18. In this configuration, the PCB 28 and/or the hub 48 may be omitted from the meter pointer 1. The meter pointer 1 may include a microcomputer to have at least a part of the function of the ECU 30.

The jack connector 60 may be in another form having two or more contacts configured to conduct an electrical signal (driver data) therethrough. The key configuration may be omitted from the jack connector 60 and the drive shaft 110. The jack connector 60 may have the key 118, and the drive shaft 110 may have the key groove 88. A spline configuration including multiple keys and key grooves may be employed in the connection between the jack connector 60 and the drive shaft 110.

The animation and effects shown in FIGS. 5A to 8 and the application of the animation and effects, such as notification of acceleration and welcome sequence, may be variously combined. For example, the animation shown in FIGS. 5A to 5C may be applied to the welcome sequence. In the above examples, the ON-pixel portion and the OFF pixel portion may be inverted.

Summarizing the above description, the meter pointer 1 for the meter 2 includes the arm 10 including the display 12. The display 12 has the dot-matrix array including the plurality of pixels. Each of the pixels may be configured to change in intensity. The dot-matrix array may be configured to indicate the graphic image with at least one of the pixels by controlling the intensity of each of the pixels.

The driver 20 may be integrated with the arm 10 and may be configured to control electricity supplied to each of the pixels to control the intensity. The display 12 may include the dot-matrix layer 14 and the substrate 18. The dot-matrix layer 14 may be stacked on the substrate 18. The dot-matrix layer 14 may include the dot-matrix array. The pixels may be arranged in two directions perpendicular to each other to form the dot-matrix array. The dot-matrix array may be configured to switch indication of graphic images sequentially to show a moving picture. Each of the pixels may be configured to change its color. The display 12 may be configured to indicate a graphic image movable along the longitudinal direction of the display 12. The display 12 may be configured to indicate the graphic image changeable in size in at least one of the width direction of the display 12 and the longitudinal direction of the display 12. The display 12 may be configured to indicate the graphic image representing at least one of a letter and a symbol. The display 12 may be configured to indicate a graphic image representing the bar-scale 520 changeable in length along the longitudinal direction of the display 12 according to the state of the vehicle equipped with the meter pointer 1. The display 12 may be configured to modify the graphic image when the vehicle equipped with the meter pointer 1 moves from a first region employing the primary speed scale into a second region employing the secondary speed scale, which is different from the primary speed scale. The display 12 may be configured to modify the graphic image to notify the driver of at least one of turning of the vehicle equipped with the meter pointer 1, acceleration of the vehicle, and deceleration of the vehicle.

The meter pointer 1 may further include the electrical connector 60 electrically coupled with the driver 20 and electrically connectable with the meter 2 to conduct the driver signal to the driver 20. The electrical connector may be the jack connector 60 including electric contacts 72, 74, 76 and electric insulators 73, 75 arranged alternatively in the axial direction of the jack connector 60. The electric insulators 73, 75 may be dented relative to the electric contacts 72, 74, 76 in the radial direction. The jack connector 60 may be configured to be fitted to the tubular drive shaft 110 of the meter 2 when the meter pointer 1 is equipped to the meter 2. The jack connector 60 has the outer circumferential periphery having one of the key groove 88 and the key 118. The drive shaft 110 has the inner circumferential periphery having the other of the key groove 88 and the key 118. The key groove 88 is dented in the radial direction and extending along the axial direction. The key 118 is protruded in the radial direction and extending along the axial direction. The key groove 88 is fitted to the key 118 to restrict rotation of the meter pointer 1 relative to the drive shaft 110, when the jack connector 60 is fitted to the tubular drive shaft 110.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A meter pointer for a meter, the meter pointer comprising:
    an arm including a display, wherein
    the display has a dot-matrix array including a plurality of pixels,
    each of the pixels is configured to change in intensity, and
    the dot-matrix array is configured to indicate a graphic image with at least one of the pixels by controlling the intensity of each of the pixels.

2. The meter pointer according to claim 1 further comprising:
    a driver integrated with the arm and configured to control electricity supplied to each of the pixels to control the intensity.

3. The meter pointer according to claim 1 wherein
    the display includes a dot-matrix layer and a substrate,
    the dot-matrix layer is stacked on the substrate, and
    the dot-matrix layer includes the dot-matrix array.

4. The meter pointer according to claim 1 wherein the pixels are arranged in two directions perpendicular to each other to form the dot-matrix array.

5. The meter pointer according to claim 1 wherein the dot-matrix array is configured to switch indication of graphic images sequentially to show a moving picture.

6. The meter pointer according to claim 1 wherein each of the pixels is configured to change its color.

7. The meter pointer according to claim 1, wherein the display is configured to indicate the graphic image movable along a longitudinal direction of the display.

8. The meter pointer according to claim 1, wherein the display is configured to indicate the graphic image changeable in size in at least one of a width direction of the display and a longitudinal direction of the display.

9. The meter pointer according to claim 1, wherein the display is configured to indicate the graphic image representing at least one of a letter and a symbol.

10. The meter pointer according to claim 1, wherein the display is configured to indicate the graphic image representing a bar-scale changeable in length along a longitudinal direction of the display according to a state of a vehicle equipped with the meter pointer.

11. The meter pointer according to claim 1, wherein the display is configured to modify the graphic image when a vehicle equipped with the meter pointer moves from a first region employing a primary speed scale into a second region employing a secondary speed scale, which is different from the primary speed scale.

12. The meter pointer according to claim 1, wherein the display is configured to modify the graphic image to notify a driver of at least one of turning of a vehicle equipped with the meter pointer, acceleration of the vehicle, and deceleration of the vehicle.

13. The meter pointer according to claim 1 further comprising:
    an electrical connector electrically coupled with the driver and electrically connectable with the meter to conduct a driver signal to the driver.

14. The meter pointer according to claim 13, wherein
    the electrical connector is a jack connector including electric contacts and electric insulators arranged alternatively in an axial direction of the jack connector, and
    the electric insulators are dented relative to the electric contacts in a radial direction.

15. The meter pointer according to claim 14, wherein
    the jack connector is configured to be fitted to a tubular drive shaft of the meter when the meter pointer is equipped to the meter,
    the jack connector has an outer circumferential periphery having one of a key groove and a key,
    the drive shaft has an inner circumferential periphery having an other of the key groove and the key,
    the key groove is dented in the radial direction and extending along an axial direction,
    the key is protruded in the radial direction and extending along the axial direction, and
    the key groove is fitted to the key to restrict rotation of the meter pointer relative to the drive shaft, when the jack connector is fitted to the tubular drive shaft.

\* \* \* \* \*